United States Patent [19]

Diedrickson

[11] Patent Number: 5,744,801
[45] Date of Patent: Apr. 28, 1998

[54] EARTH HORIZON SENSOR WITH STAGGERED ARRAY OF SENSORS

[75] Inventor: Neil Diedrickson, Stratford, Conn.

[73] Assignee: Servo Corporation of America, Hicksville, N.Y.

[21] Appl. No.: 552,612

[22] Filed: Nov. 3, 1995

[51] Int. Cl.⁶ .................................................. G01J 5/10
[52] U.S. Cl. ...................... 250/349; 250/342; 244/171
[58] Field of Search ............................ 250/342, 349, 250/338.3; 244/171

[56] References Cited

U.S. PATENT DOCUMENTS

| | | | |
|---|---|---|---|
| 3,418,478 | 12/1968 | Falbel | 250/201 |
| 3,638,021 | 1/1972 | Hickerson | 250/83.3 |
| 4,942,301 | 7/1990 | Voles | 250/332 |
| 5,055,683 | 10/1991 | McCracken | 250/334 |
| 5,189,295 | 2/1993 | Falbel | 250/206.2 |
| 5,225,885 | 7/1993 | Beard et al. | 356/141 |
| 5,399,862 | 3/1995 | Savoca | 250/349 |
| 5,455,424 | 10/1995 | Doctor | 250/342 |
| 5,477,052 | 12/1995 | Doctor | 250/349 |

FOREIGN PATENT DOCUMENTS 2 555 312  5/1985  France ........................ 250/349

*Primary Examiner*—Edward J. Glick
*Attorney, Agent, or Firm*—Kane,Dalsimer,Sullivan, Kurucz, Levy, Eisele and Richard, LLP

[57] ABSTRACT

The earth horizon sensor apparatus uses first and second linear sensor arrays of sensor elements, the first and second linear sensor arrays being staggered with respect to each other. The sensor elements are preferably pyroelectric elements for detecting the presence or absence of infrared radiation from the Earth and Space. A microprocessor is used to determine which of the sensor elements subtends the diffuse horizon gradient and the constant zero radiance of Space. The attitude of the spacecraft is thereby calculated.

7 Claims, 2 Drawing Sheets

EARTH HORIZON SENSOR WITH STAGGERED ARRAY OF SENSORS

BACKGROUND OF THE INVENTION

1. Field of the Invention

This invention pertains to a sensor for detecting the horizon of the Earth from a satellite, and more particularly to a sensor with a staggered array of elements for improved horizon sensor accuracy.

2. Description of the Prior Art

Earth horizon sensors or horizon crossing indicators are used to determine a satellite's attitude, that is, the pitch and the roll of the satellite. This can be done based on the fact that Earth radiates infrared energy, while Space emits essentially no infrared energy. The boundary between the two as viewed from the satellite establishes a reference point—the horizon—for navigation of the satellite. Examples of earth horizon sensors can be found in application Ser. No. 08/229,460, filed Apr. 18, 1994, entitled "Earth Sensor for Satellites with Radiance Compensation", now U.S. Pat. No. 5,477,052, and in application Ser. No. 08/227,270, filed Apr. 13, 1994, entitled "Earth Sensor for Satellites", now U.S. Pat. No. 5,455,424.

However, an element of uncertainty can occur because, while the sensor array typically includes a linear array of discrete elements, the horizon boundary is not discrete but gradually diminishes in intensity from Earth to Space.

In some cases, current horizon sensors do not account for the diffuse nature of the infrared horizon. In other cases, radiance measurements of the Earth are used in mathematical calculations to reduce the uncertainty.

OBJECTS AND SUMMARY OF THE INVENTION

It is therefore an object of this invention to provide an earth horizon sensor for satellites which has improved horizon sensor accuracy by accounting for the diffuse nature of the infrared horizon.

This and other objects are attained by providing a staggered dual array of sensors in order to ensure that one of the sensor elements is always viewing the horizon gradient, which may be diffuse, between Earth and Space. Relatively small sensor elements are focused on the Earth/Space boundary or horizon gradient, obtaining information unbiased by large Earth signals. Earth and Space signals are constantly monitored for calibration. By determining which sensor element is viewing the horizon gradient, and further by evaluating the relative strength of the signal, the attitude of the spacecraft can be determined accurately.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
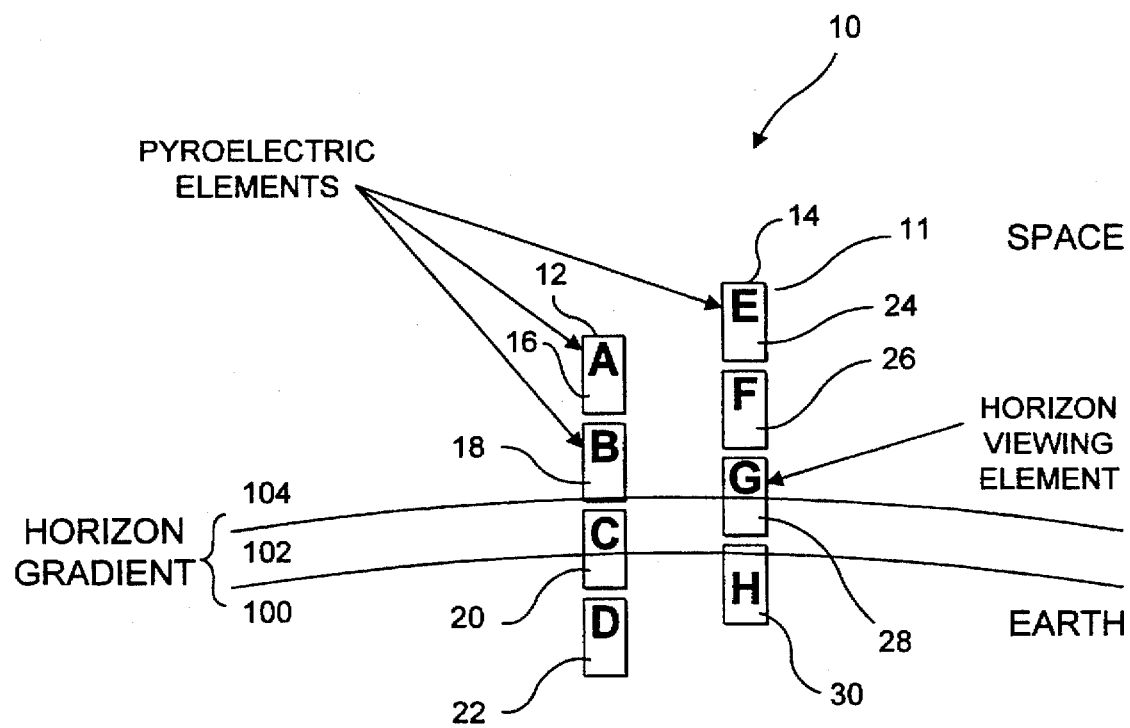
FIG. 1 is a schematic of the staggered dual linear sensor arrays of the present invention.

Referring now to the drawings in detail wherein like numerals refer to like elements throughout the several views, one sees that FIG. 1 is a schematic of the staggered dual linear sensor array 11 of earth horizon sensor apparatus 10 including a first linear sensor array 12 with sensor elements 16, 18, 20, 22 staggered with respect to sensor elements 24, 26, 28, 30 of a second linear sensor array 14. The sensor elements of first linear sensor array 12 and the sensor elements of second linear sensor array 14 are staggered, that is, a line drawn between the center of corresponding elements of the first and second linear sensor arrays 12, 14 would not be perpendicular to the linear sensor arrays themselves, but rather would form an oblique angle. Preferably, sensor elements of first linear sensor array 12 are equally offset with respect to successive sensor elements of second linear sensor array 14.

Sensor elements 16–30 are typically pyroelectric sensor elements.

First and second linear sensor arrays 12 and 14 are oriented to be perpendicular to the projection or image of horizon gradient 102 which is formed at the intersection of Earth 100, which emits infrared radiation, and Space 104, which emits essentially no infrared radiation. As stated previously, horizon gradient 102 is diffuse rather than discontinuous.

Outer upward sensor elements 16 and 24 view Space 104 while outer downward sensor elements 22 and 30 view Earth 100 in order to provide calibration for earth horizon sensor apparatus 10. However, due to the staggered nature of the first and second linear sensor arrays 12 and 14, one of the inner sensor elements 18, 20, 26, 28 subtends the horizon gradient 102 and the constant zero radiance of Space 104 thereby resulting in greater accuracy of earth horizon sensor apparatus 10. In FIG. 1, inner sensor element 28 is illustrated as subtending the horizon gradient 102 and Space 104.

By using sensor elements 16, 22, 24 and 30 for calibration as described above, it can be determined which of inner sensor elements 18, 20, 26, 28 subtends the horizon gradient 102 and Space 104, thereby determining the attitude, that is, pitch and roll, of the satellite. Moreover, by evaluating the relative strength of the signal, the attitude can be determined to a finer degree.

This earth horizon sensor apparatus 10 is based on the capability of the sensor elements 16–30 of staggered dual linear sensor array 11 to measure radiance from a small field of view. By viewing the horizon gradient 102, and not including a signal from the Earth 100, the sensor can attain accuracies of 0.06 degrees for non-polar orbits and 0.12 degrees for polar orbits. This compares with 0.10 degrees and 0.25 degrees, respectively, for typical prior art sensors. This is roughly a factor of two improvement in accuracy.

Figure 2:
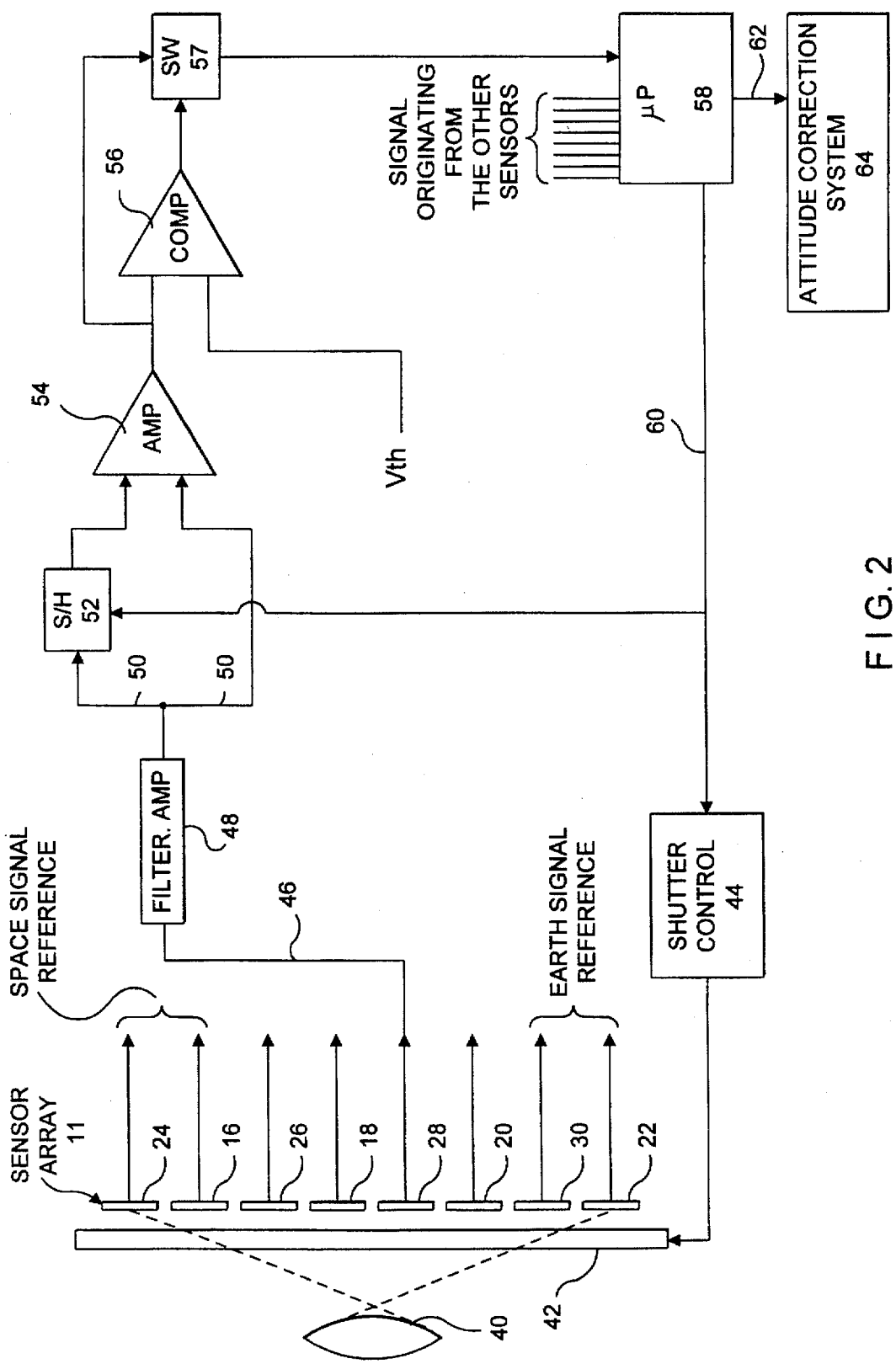
FIG. 2 is a schematic of typical electronics of an implementation of the present invention.

FIG. 2 is a schematic of the typical electronics of earth horizon sensor apparatus 10. This electronics is somewhat similar to that disclosed in application Ser. No. 08/229,460, filed Apr. 18, 1994, entitled "Earth Sensor for Satellites with Radiance Compensation", now U.S. Pat. No. 5,477,052, and in application Ser. No. 08/227,270, filed Apr. 13, 1994, entitled "Earth Sensor for Satellites", now U.S. Pat. No. 5,455,424, the entire disclosures of which are hereby incorporated by reference.

As shown in FIG. 2, the staggered dual linear sensor array 11 and the lens 40 are positioned so that an image of the Earth and its horizon gradient 102 is projected by lens 40 on the staggered dual linear sensor array 11. A shutter 42 is positioned either in front of the lens 40, or as shown in FIG. 2 between the lens 40 and sensor array 11. The shutter 42 is controlled by a shutter control circuit 44 to selectively block the image of the Earth 100 and Space 104 from the staggered dual linear sensor array 11.

Outer upward sensor elements 16 and 24 view Space 104 and provide space reference signals while outer downward sensor elements 22 and 30 view Earth 100 and provide earth reference signals in order to provide calibration for sensor apparatus 10.

Inner sensor elements 18, 20, 26, 28 provide signals, one of which will be primarily directed to horizon gradient 102. As sensor element 28 is illustrated as being primarily directed to horizon gradient 102 in FIG. 1, the electronics is shown with regard to sensor element 28, although the other sensor elements 16, 18, 20, 22, 24, 26, 30 have similar electronics.

Sensor element 28 detects the incident infrared radiation and generates a corresponding electrical signal on line 46. This signal is conditioned by a signal conditioning circuit 48, which may include filtering and amplification means. The conditioned signal is fed on lines 50 to a sample-and-hold circuit 52 and a differential amplifier 54. Amplifier 54 also receives and input from the sample-and-hold circuit 52. The output of amplifier 54 is fed to a comparator 56 which also receives a threshold value Vth as an input. The output of amplifier 54 is also fed to a microprocessor 58 through an electronic switch 57 controlled by comparator 56. The microprocessor 58 receives similar signals from other signal processing circuits substantially identical to the circuit just described, the signals originating from the other sensor elements 16, 18, 20, 22, 24, 26, 30.

Microprocessor 58 uses the reference signals from sensor elements 16, 22, 24, 30 to determine which of sensor elements 18, 20, 26, 28 is oriented toward horizon gradient 102, and further analyzes the relative strength of the signal from the sensor element 18, 20, 26, 28 oriented toward the horizon gradient. This information is used to generate control signals sent on line 62 to attitude correction system 64. It should be understood that all or most of the circuitry shown in FIG. 2 may be incorporated into the microprocessor 58 and is shown as having discrete components for the sake of clarity.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. An earth horizon sensor apparatus including:
    at least a first linear array and a second linear array of sensor elements wherein said sensor elements of said first linear array are staggered with respect to said sensor elements of said second linear array; and
    processing means for determining an attitude of the earth horizon sensor apparatus by determining which of said sensor elements subtends an image of Space and a diffuse horizon gradient between Earth and Space.

2. The earth horizon sensor apparatus of claim 1 wherein at least one of said sensor elements is used to provide a reference signal from Space.

3. The earth horizon sensor apparatus of claim 2 wherein at least one of said sensor elements is used to provide a reference signal from Earth.

4. The earth horizon sensor apparatus of claim 3 wherein said processing means further includes means for analyzing relative strength of a signal from said sensor element which subtends an image of a horizon gradient and Space in order to determine attitude more accurately.

5. The earth horizon sensor apparatus of claim 4 wherein sensor elements of said first linear sensor array are equally offset from successive sensor elements of said second linear sensor array.

6. The earth horizon sensor apparatus of claim 5 wherein said sensor elements of said first and second linear sensor arrays are pyroelectric.

7. The earth horizon sensor apparatus of claim 6 wherein said processing means outputs signals to an attitude correction means.

* * * * *